F. SCHRÖDER.
METHOD OF OPERATING INTERNAL COMBUSTION ENGINES AND PREHEATING DEVICE THEREFOR.
APPLICATION FILED NOV. 9, 1912.
1,099,862.
Patented June 9, 1914.
2 SHEETS—SHEET 1.
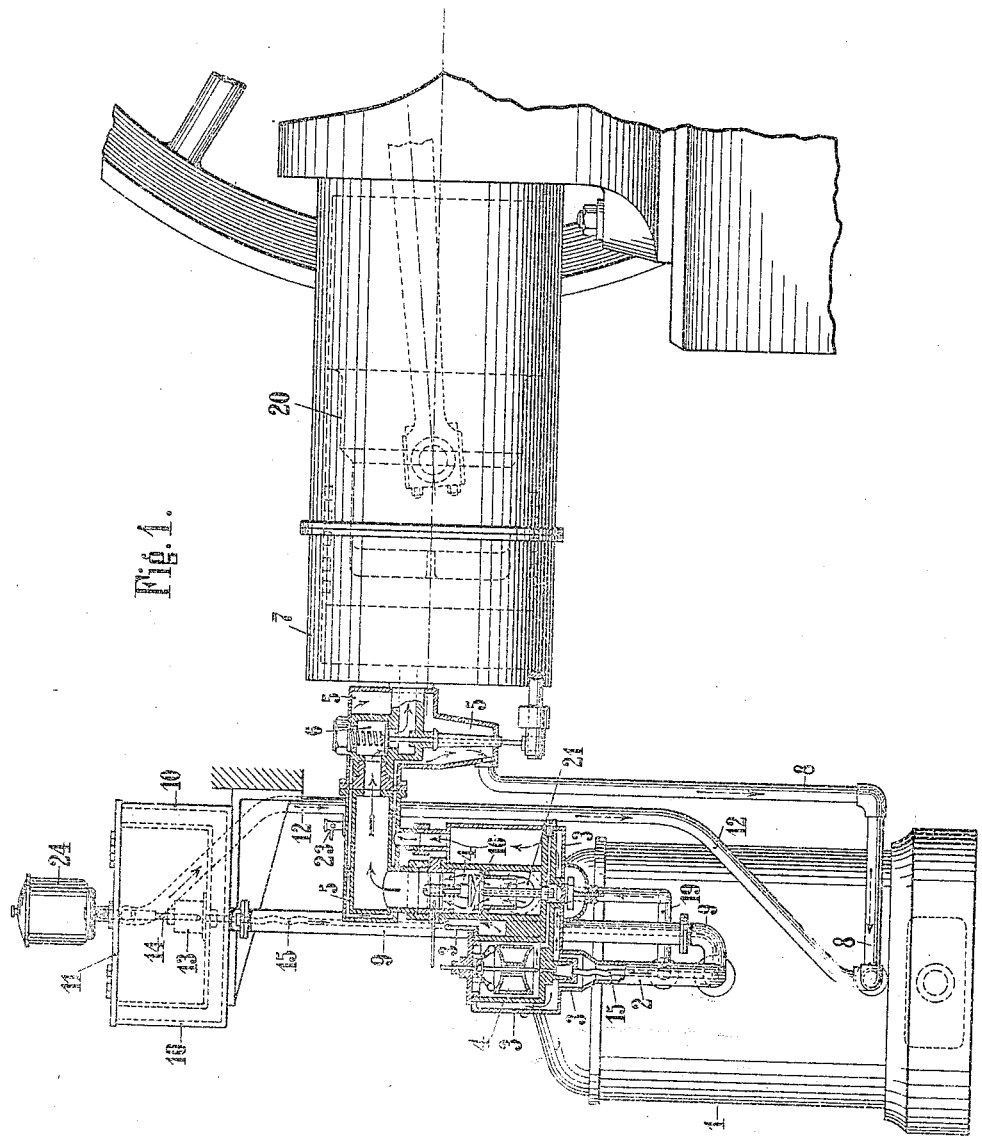
Witnesses:
John E. Prager
A. Worden Gibbs
Inventor
Fritz Schröder

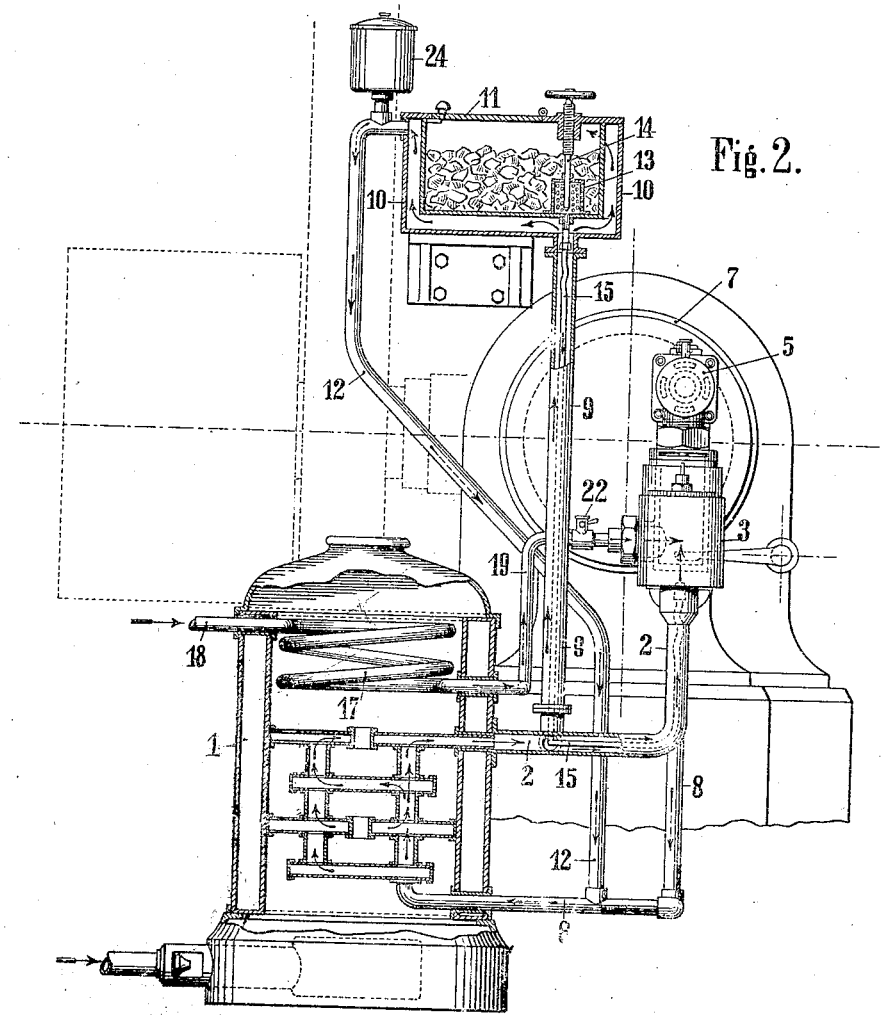

UNITED STATES PATENT OFFICE.

FRITZ SCHRÖDER, OF CHARLOTTENBURG, GERMANY, ASSIGNOR OF ONE-HALF TO GEORGE ADOLF KUBLER, OF BERLIN, GERMANY.

METHOD OF OPERATING INTERNAL-COMBUSTION ENGINES AND PREHEATING DEVICE THEREFOR.

1,099,862.       Specification of Letters Patent.    Patented June 9, 1914.

Application filed November 9, 1912. Serial No. 730,314.

*To all whom it may concern:*

Be it known that I, FRITZ SCHRÖDER, a subject of the King of Prussia and German Emperor, and a resident of Schlüterstrasse 62, Charlottenburg, near Berlin, Germany, have invented new and useful Improvements in the Method of Operating Internal-Combustion Engines and Preheating Devices Therefor; and I do hereby declare the following to be a full, clear, and exact description of the invention, such as will enable others skilled in the art to which it appertains to make and use the same.

This invention relates to apparatus for driving internal combustion engines with naphthalene or the like.

In certain known apparatus for running internal combustion engines with solid or slightly volatile hydrocarbons such as naphthalene a water chamber surrounding the fuel reservoir and in constant communication with the water jacket for cooling the motor constitutes with the latter a water jacket surrounding in common the combustible gas and vaporization conduits, and this jacket is provided with a furnace for the preliminary heating of the water for starting the motor. The heat thus imparted to the water is there utilized for melting the fuel and supplying it in the liquefied and heated state, and also for heating the air to be supplied for forming with the vaporized fuel the explosive mixture. After the motor has been started the furnace is extinguished and the heat which is then continouously generated in and by the motor itself is relied on for maintaining the water in the system in a sufficiently heated state for continuing the operation of the motor.

In systems of that known kind in which the heat of the water has to be relied on for heating the air it is of course not possible to heat the air to a temperature of more than 100° C. For the same reason it is also impossible, in the case of naphthalene or similar fuel to always maintain the latter in the liquid state in the engine, without including the cooling-water space of the cylinder in the common water circulating system. Similar objections are connected with other known constructions wherein either the heat of the cooling water or the heat of the exhaust gases of the engine is utilized for liquefying such fuels as naphthalene or others having a high evaporation temperature.

The object of this present invention is to obviate these difficulties and to this end the invention consists substantially in providing, in connection with a system or conduit for circulating a heat-carrying medium, such as water, around the fuel reservoir and fuel-receiving parts of the engine from a special heat generator, a separate hot-air conduit which extends from said heat generator to the engine for continuously supplying the latter with highly heated air to there become mixed with the naphthalene so as to evaporate it and form therewith the explosive mixture.

Other features of the invention will be hereinafter referred to in detail.

The accompanying drawings illustrate a preferred example of an installation for carrying out the invention in connection with naphthalene.

Figure 1 shows the invention as applied to an internal combustion engine of a known kind, partly in vertical section through the center of the gasifier of the motor and adjoining parts, some parts being shown broken. Fig. 2 is an elevation taken at an angle of 90° with regard to Fig. 1, also showing parts broken and in section.

From a heating apparatus 1 of any well known kind a heating conduit 2 conveys the heating medium (for instance hot water) through the jacketing 3 of the gasifier 4 in the direction of the arrows shown, thence through the jacketing 5 of the valve apparatus 6 and the adjoining parts leading to the engine cylinder 7 and back to the heating apparatus 1 by way of the conduit pipe 8. A branch 9 of the conduit 2, on the other hand, conveys the heating medium into the jacket 10 of a naphthalene reservoir 11. Thence the heating medium flows by way of a pipe 12 and the return conduit 8 connected thereto back into the heating apparatus 1 to there complete its circuit through the system. The naphthalene contained in the reservoir 11 thereby becomes liquefied and flows first through the filter 13, leaving its associated impurities behind there, thence through the opened valve 14 into a pipe 15 which terminates in the gasifier and is surrounded by the heating conduit 9, and thence into the gasifier 4 to pass therethrough in the well known manner to the spraying device 16.

In the embodiment of the invention shown the heating of the air to be mixed with the spray of liquid naphthalene in the gasifier is effected in the following manner: In the top of the heating apparatus is provided a serpentine pipe 17. Under the action of the fire gases rising from the furnace portion in the bottom of the heating apparatus this serpentine and the air entering thereinto at 18 become highly heated and this heated air then passes through a pipe 19 into the gasifier 4. By the movement of the piston 20 in the engine cylinder 7 the air is drawn in through the opening 21 into the gasifier 4 and there becomes mixed with the naphthalene. The high temperature of the air arriving at this point acts to evaporate the naphthalene and to render it inflammable, the explosive mixture then passes by way of the valve apparatus 6 into the engine cylinder 7 in the well known manner to there become exploded by the fusing device not shown in the drawings. A valve 22 in the air feed pipe 19 admits of introducing colder air in the operation of the engine to thereby increase the compression. Another valve 23 provided at the highest point of the jacketing 5 permits of venting such air as may interfere with the circulation of the heating medium. 24 is the usual expansion vessel of the heating system. The heating system maintains the naphthalene continually in the liquid state independently of the heat of the engine and all parts of the engine which come into contact with the naphthalene are maintained at a temperature higher than the melting temperature of the naphthalene. The naphthalene reservoir may be made of such dimensions as may be required for the respective system, and so as to require only one filling of the reservoir for the whole day, thus dispensing with the necessity of providing a special attendant. The reservoir may, if desired, be located in any suitable place, for instance entirely outside of the engine room, so that no inconvenience will arise from the smell of the naphthalene. The use of a special other combustible for starting the engine is here not necessary, since the air heated to a temperature above 300° C. will be found fully sufficient to heat the liquefied naphthalene beyond the evaporation temperature of 215° C. as it arrives in the gasifier.

I claim:

1. The combination with an internal combustion engine, and combustible-receiving parts therefor; of a combustible-reservoir, a combustible-supply conduit extending therefrom to the engine, a heat generator independent of the engine, heat circulating conduits between the heat generator, on the one hand, and the combustible-reservoir and engine, on the other hand, said heat circulating conduits being adapted to supply, continously during the operation of the engine, heat from said heat generator to the combustible reservoir and the combustible-receiving parts of the engine to liquefy the combustible solid at ordinary temperature; and an air conduit to supply, continuously during the operation of the engine, heated air to the heated and liquid combustible to form with it an explosive mixture.

2. The combination, with an internal combustion engine, of a jacketed combustible-reservoir, a combustible-supply conduit extending therefrom to jacketed combustible-receiving parts of the engine, a heat generator separate from the engine, a heat circulating conduit extending from the heat generator into the jacketing of the said combustible-receiving parts of the engine and back, a heat circulating conduit extending from the heat generator around the said combustible-supply conduit into the jacketing of the combustible-reservoir and back to the heat generator, and a hot-air conduit extending from the heat generator into the combustible-receiving parts of the engine for conveying heated air thereinto.

3. The combination, with an internal combustion engine, of a jacketed combustible-reservoir, a combustible-supply conduit extending therefrom to a jacketed evaporating chamber of the engine, a heat generator separate from the engine, a heat circulating conduit emanating from the heat generator and extending with one branch into the jacketing of the evaporating chamber and connected engine parts and back therefrom and extending with another branch around the said combustible-supply conduit into the jacketing of the said combustible-reservoir and back to the heat generator by way of a return conduit common to both branches, and a hot-air conduit extending from a serpentine within the heat generator into the jacketed evaporating chamber of the engine.

In testimony, that I claim the foregoing as my invention, I have signed my name in presence of two subscribing witnesses.

FRITZ SCHRÖDER.

Witnesses:
HENRY HASPER,
WOLDEMAR HAUPT.